March 7, 1967  R. D. MARTIN, JR  3,307,719
FLOATING RAMP
Filed April 23, 1965
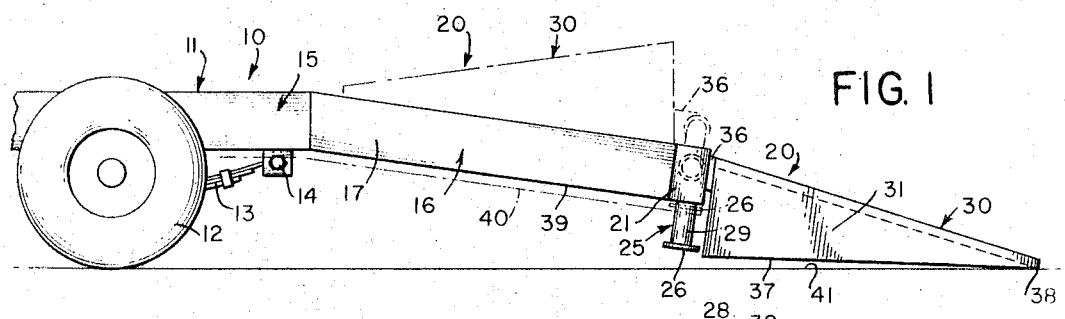
FIG. 1
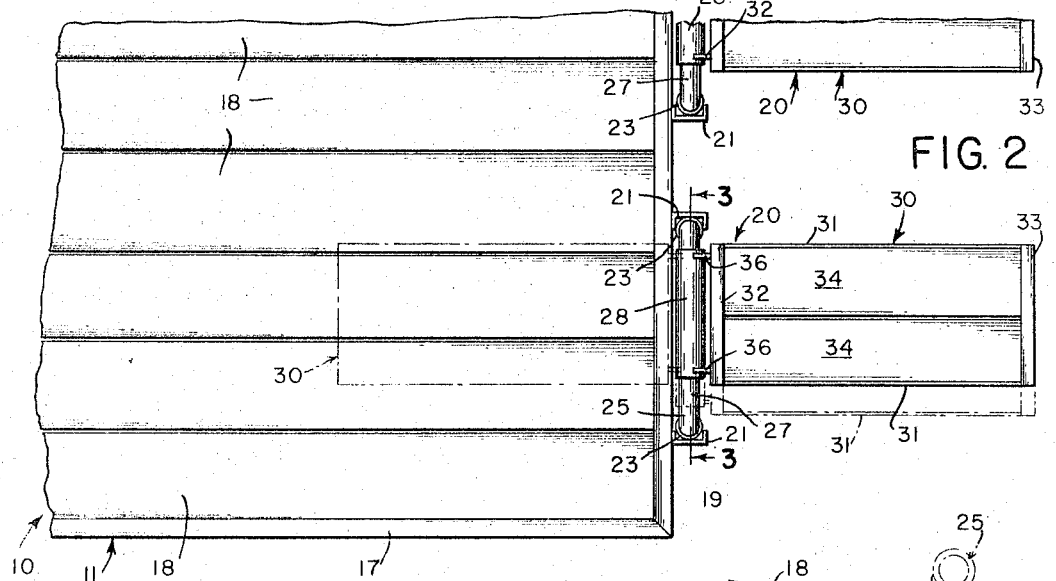
FIG. 2
FIG. 3
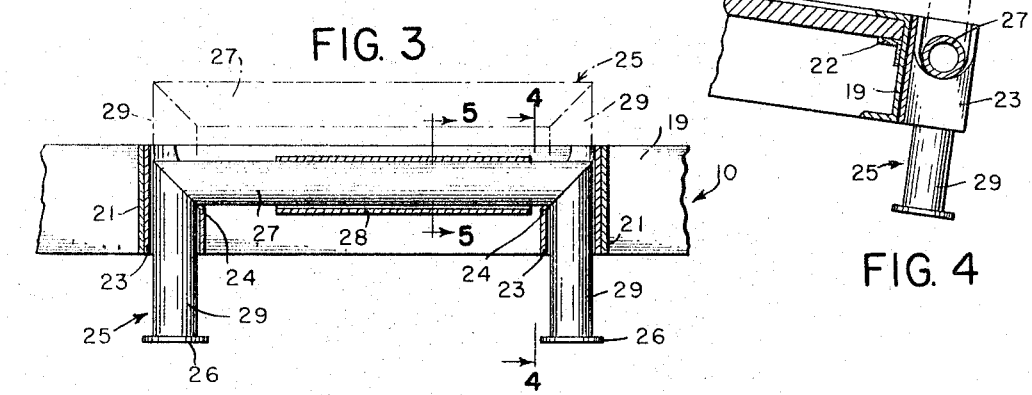
FIG. 4
FIG. 5
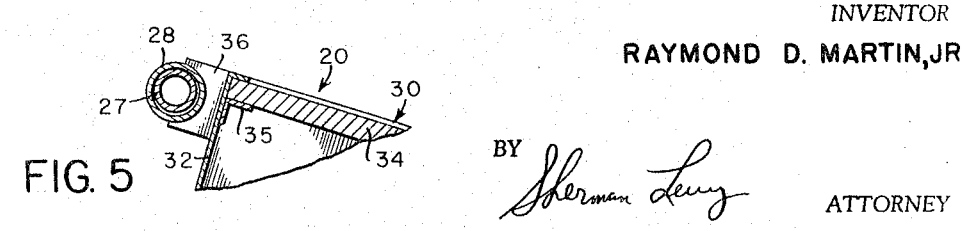
INVENTOR
RAYMOND D. MARTIN, JR.
BY *Sherman Levy*
ATTORNEY 3,307,719
FLOATING RAMP
Raymond D. Martin, Jr., Centreville, Md., assignor to Tag-A-Long Trailers, Inc., Centreville, Md.
Filed Apr. 23, 1965, Ser. No. 450,331
2 Claims. (Cl. 214—85)

The present invention relates to a ramp construction, and more particularly to a ramp for use with trailers and the like.

An object of the present invention is to provide an improved ramp for use with trailers and the like wherein there is provided a pair of members that are adapted to be operatively connected to the rear end of a trailer and wherein in one position the ramps will permit various types of loads such as tractors, farm implements and the like to be readily moved onto or off of the trailer, and wherein when the trailer is not being loaded or unloaded, the ramps are adapted to be moved to a position on top of the trailer.

Another object is to provide a floating ramp that is constructed and arranged so that it will float or be capable of moving laterally as well as up and down so that the ramps will accommodate tractors, or other members having different sizes or wheel bases.

Another object is to provide an apparatus of the character described that may be utilized speedily and with precision by even inexperienced operators.

Further objects and advantages are to provide improved elements and arrangements thereof in a device of the character described that is economical to produce, durable in form, and conducive to the most economical use of materials and uniformity of members formed therefrom.

Still further objects and advantages will become apparent in the subsequent description in the specification.

In the drawings:

FIG. 1 is a fragmentary side elevational view illustrating the present invention.

FIG. 2 is a fragmentary top plan view.

FIG. 3 is an enlarged sectional view taken on the line 3—3 of FIG. 2.

FIG. 4 is a sectional view taken on the line 4—4 of FIG. 3.

FIG. 5 is a sectional view taken on the line 5—5 of FIG. 3.

Referring in detail to the drawings, the numeral 10 indicates a trailer which includes a frame 11 as well as ground engaging wheels 12, and springs 13 which may be connected to the trailer as at 14, FIG. 1. The trailer 10 may include a generally main horizontally disposed portion 15 as well as a rearwardly disposed inclined section 16. The trailer is adapted to consist of spaced apart side pieces 17 as well as base or floor members 18 made of a suitable material, and the numeral 19 indicates a horizontally disposed channel member that is suitably affixed at the rear end of the trailer 10.

According to the present invention there is provided a pair of floating ramps which are each indicated generally by the numeral 20, FIG. 2, and because each of the ramps 20 has the same construction, a description of one will suffice for both. As shown in the drawings, a pair of vertically disposed channel pieces 21 are adapted to be secured as by welding to the rear surface of the channel member 19. The numeral 22 indicates a brace which may be affixed to the channel member 19 for helping to support the floor members 18.

There is further provided a pair of vertically disposed spaced parallel collars or tubular members 23 which are secured to or formed integral with the channel pieces 21, and the upper inner portions of the collars 23 are cut out or cut away as at 24 for a purpose to be later described The numeral 25 indicates a floating or adjustable support member which has a generally inverted U-shape, FIG. 3, and the support member 25 includes a pair of spaced parallel vertically disposed legs 29 that are vertically adjustable in the pair of collars 23. Flanges 26 are fixedly secured to the lower ends of the legs 29 and the flanges 26 provide stop pieces. The support member 25 further includes a horizontally disposed cross element 27 which interconnects the upper portions of the legs 29 together, and a horizontally disposed sleeve 28 is swivelly or movably mounted on the cross element 27. As shown in the drawings, the sleeve 28 is of less length than the cross element 27.

The ramps further include body pieces which are indicated generally by the numeral 30, and the body pieces comprise generally triangular shaped side plates 31 as well as end elements or plates 32 and 33 and planks or base members 34. The numeral 35 indicates a brace that is adapted to be used for helping to support the members 34, FIG. 5. The members 30 are adapted to be connected to the sleeves 28 as for example by means of spaced parallel brackets or extensions 36 which can be welded or otherwise affixed in place.

From the foregoing, it will be seen that there has been provided a floating ramp construction which is especially suitable for use with vehicles such as trailers, and in use, with the parts arranged as shown in the drawings, when a load such as a wheeled implement, vehicle, tractor or the like is to be loaded on the trailer 10 or removed therefrom, the members 30 are adapted to be arranged in the solid line position of FIG. 1. When the trailer 10 is being moved from place to place along a highway, road or the like, the members 30 are in the raised position shown in dotted or broken lines in FIG. 1 so that the members 30 rest upon the rear section 16 of the trailer 10 at that time.

It is to be noted that there is provided a pair of the ramps 20 which each have the same construction so that the wheels of the tractor or other member being loaded or unloaded from the trailer can readily move along the members 30 when the members 30 are in the down position shown in solid lines in FIG. 1. In FIG. 1, with the members 30 in loading and unloading position as shown in solid lines, the edge 37 of the member 30 has a portion thereof spaced slightly above the ground 41 so that only the rear lower edge portion 38 may contact the ground. Then, as a tractor or other member moves up or down along the members 30, the edge 37 can move downward to contact the ground 41 and this acts as a safety feature to compensate for uneven ground surfaces and the like. In addition, as shown in FIG. 1 as the load moves along the section 16 of the trailer 10, the springs 13 will give slightly so that the lower edge 39 can move downwardly as for example to a position indicated by the dotted line 40.

The connection of the ramps to the rear end of the trailer is such that the ramps or members 30 can shift laterally as for example from the solid line position shown in FIG. 2 to the dotted line position shown in FIG. 2 or vice versa. This therefore provides a floating action which permits the members 30 to shift laterally so that for example when tractors, farm implements and the like having different distances between their wheels are being loaded onto or off of the trailer, the members 30 can be shifted laterally in order to accommodate these different sizes of loads in the desired manner. This lateral floating action is possible due to the fact that the sleeve 28 is of less length than the cross element 27 of the support member 25 and because the members 30 are connected to the sleeve 28 by means of the extensions 36, it will be seen that the operator or user can readily manually move or shift the members 30 from side to side a sufficient distance to accomplish this result, and as the members 30 are shifted laterally, the sleeves 28 will likewise be able to shift or slide laterally on the cross element 27 of the support member 25.

With the members 30 in the solid line position of FIG. 1, a tractor or the like can be readily driven or moved up or down on the ramps to facilitate loading and unloading of the trailers and the parts are arranged and constructed so that there will be a smooth surface between the ramps and the rear portion of the trailer to facilitate loading and unloading of the trailer.

After the trailer has been loaded or unloaded in the desired manner, it is only necessary to manually raise or pivot the members 30 in a counter-clockwise direction, FIG. 1, so that the members 30 can be readily moved from the solid line position of FIG. 1 to the dotted line position of FIG. 1 and when this movement takes place, the parts including the support member 25 will be raised or lifted from the solid line position shown in FIG. 3 to the dotted line position of FIG. 3 due to the slideable mounting of the legs 29 within the stationary collars 23. This action provides a further floating movement and permits the ramps to be positioned upon the rear portion of the trailer when the ramps are not needed or when they are not being used. As previously described, the inner upper portions of the collars 23 are adapted to be recessed or cut away as at 24 and this provides sufficient clearance for the portion such as the portion 27 of the support member 25 when the support member 25 is in its lowermost position as shown in solid lines in FIG. 3. The flanges 26 provide stops for limiting upward movement of the legs 29 in the collars 23 and hence the flanges 26 help prevent the parts from becoming inadvertently separated.

The parts can be made of any suitable material and in different shapes or sizes.

While the present invention has been specifically described for use as loading ramps for a trailer, it is to be understood that the present invention is applicable to other types of units or members such as trucks and the like, although the present invention is primarily and especially suitable for use with trailers. The ramps can be shifted laterally to permit the ramps to be aligned with the wheels of the load or tracks of a tractor or the like that is being loaded onto or unloaded from the trailer.

It is to be noted that when the members 30 are swung or moved upwardly from the solid line position of FIG. 1 to the dotted line position of FIG. 1, the support member 25 is moved upwardly to the dotted line position such as the dotted line position shown in FIG. 3. Similarly, when the members 30 are moved in a clockwise direction from the dotted line position of FIG. 1 to the solid line position of FIG. 1, the member 25 automatically moves downwardly to the solid line position shown in FIG. 3 and this is due to the fact that the members 30 are connected to the sleeve 28 by means of the extensions 36 and this construction in conjunction with the previously described arrangement brings about this floating action.

The present invention thus provides a sliding or floating connection between the ramps and the trailer. With the present invention trailers can be loaded and unloaded quickly and safely, and the present invention can be made in different sizes to permit use thereof with different sizes and types of trailers or the like. In FIG. 1 in solid lines, the ramps are shown down, ready to load or unload the trailer, and in this position a tractor or the like can conveniently and readily move up the inclined members 30. When the members 30 are in the dotted line position of FIG. 1, a trailer loaded with a tractor or the like is ready to roll.

Minor changes in shape, size and rearrangement of details coming within the field of invention claimed may be resorted to in actual practice, if desired.

What is claimed is:

1. A trailer embodying a frame, wheels and springs, said frame including a rearwardly disposed inclined section having a channel member at the rear thereof, a pair of spaced parallel vertically disposed channel pieces secured to the rear of said channel member, a pair of vertically disposed spaced parallel collars secured to the inner surfaces of said channel pieces, a support member having an inverted U-shape including a pair of spaced parallel vertically disposed legs vertically adjustable in said collars, flanges on the lower ends of said legs providing stops, the upper inner portions of said collars being cut away, said support member further including a horizontally disposed cross element connecting said legs together, a horizontally disposed sleeve swivelly mounted on said cross element, said sleeve being shorter than said cross elements, a pair of ramps arranged adjacent the rear of the trailer, and said ramps being operatively connected to the trailer by a single floating pivotal connection that includes said support member and said sleeve, each of said ramps having a wedge shape pair of extensions fixedly securing each ramp to a corresponding sleeve.

2. A trailer embodying a frame, wheels and springs, said frame including a rearwardly disposed inclined portion, a pair of vertical collars secured to the rearwardly inclined portion of the frame, a support member having an inverted U-shape including a pair of spaced parallel vertically disposed legs vertically adjustable in said collars, flanges on the lower ends of said legs providing stops, the upper inner portions of said collars being cut away, said support member further including a horizontally disposed cross element connecting said legs together, a horizontally disposed sleeve swivelly mounted on said cross element, said sleeve being shorter than said cross element, and a wedge shaped ramp connected to said sleeve for floating pivotal movement.

References Cited by the Examiner
UNITED STATES PATENTS 2,966,274  12/1960  Price _____ 214—85
3,138,272  6/1964  Flowers _____ 214—85

JACOB L. NACKENOFF, *Primary Examiner.*